(12) United States Patent
Inukai

(10) Patent No.: US 8,725,023 B2
(45) Date of Patent: May 13, 2014

(54) POWER SUPPLY SYSTEM AND IMAGE FORMING APPARATUS INCLUDING THE SAME

(75) Inventor: Katsumi Inukai, Iwakura (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 349 days.

(21) Appl. No.: 13/303,840

(22) Filed: Nov. 23, 2011

(65) Prior Publication Data

US 2012/0134707 A1 May 31, 2012

(30) Foreign Application Priority Data

Nov. 30, 2010 (JP) ................................ 2010-267368

(51) Int. Cl.
*G03G 15/00* (2006.01)

(52) U.S. Cl.
USPC ........................................................... 399/88

(58) Field of Classification Search
USPC ............ 399/67–70, 75, 88, 89; 323/282–288; 361/18, 93.1, 93.2, 93.7, 93.9, 111; 363/21.07, 21.09
See application file for complete search history.

(56) References Cited

U.S. PATENT DOCUMENTS

| | | | |
|---|---|---|---|
| 6,366,479 B1 | 4/2002 | Usui et al. | |
| 6,828,762 B2 * | 12/2004 | Brkovic | 323/222 |
| 7,440,295 B2 * | 10/2008 | Na | 363/21.07 |
| 8,081,495 B2 * | 12/2011 | Vecera et al. | 363/21.12 |
| 8,139,963 B2 * | 3/2012 | Takami | 399/33 |
| 8,269,473 B2 * | 9/2012 | Noda | 323/284 |

FOREIGN PATENT DOCUMENTS

| | | |
|---|---|---|
| JP | H10-248257 A | 9/1998 |
| JP | H10-295075 A | 11/1998 |
| JP | H11-206115 A | 7/1999 |
| JP | 2001-145344 A | 5/2001 |
| JP | 2004-343900 A | 12/2004 |
| JP | 2005-020917 A | 1/2005 |
| JP | 2005-304269 A | 10/2005 |
| JP | 2008-172973 A | 7/2008 |
| JP | 2009-153234 A | 7/2009 |
| JP | 2009-296723 A | 12/2009 |

OTHER PUBLICATIONS

Japan Patent Office, Notification of Reasons for Refusal for Japanese Patent Application No. 2010-267368 (counterpart Japanese patent application), dispatched Dec. 25, 2012.
Chinese Office Action issued in CN 201110385456.0, mailed Feb. 8, 2014.

* cited by examiner

*Primary Examiner* — Hoan Tran
(74) *Attorney, Agent, or Firm* — Merchant & Gould P.C.

(57) ABSTRACT

A power supply system includes a switching power supply. The switching power supply includes an overcurrent detection circuit. The overcurrent detection circuit includes a current detecting resistor, a reference voltage generation circuit, and a comparison circuit. The current detecting resistor is provided on a secondary side of a transformer. The reference voltage generation circuit generates a first reference voltage when an output voltage of the switching power supply is a first output voltage and a second reference voltage lower than the first reference voltage when the output voltage is a second output voltage. The comparison circuit detects an overcurrent by comparing a voltage across the current detecting resistor with the first reference voltage or the second reference voltage.

9 Claims, 14 Drawing Sheets

FIG.4

| MODE | MODE CONTROL SIGNAL Sr1 | TRANSISTOR 33 | VOLTAGE DIVIDING RATIO Ka | OUTPUT VOLTAGE Vo1 | OUTPUT VOLTAGE Vo2 |
|---|---|---|---|---|---|
| NORMAL OUTPUT MODE | HIGH | ON | $\dfrac{R4}{R1+R4}$ | 24V | 3.3V |
| LOW OUTPUT MODE | LOW | OFF | $\dfrac{R2}{R1+R2}$ | 5V | 3.3V |

* R4 IS A COMBINED RESISTANCE BETWEEN R2 AND R3

FIG.6

| MODE | OUTPUT VOLTAGE Vo1 | REFERENCE VOLTAGE Vr | MAXIMUM VALUE OF OUTPUT CURRENT Io |
|---|---|---|---|
| NORMAL OUTPUT MODE | 24V | $24V \times \dfrac{R11}{R10 + R11}$ | 4A |
| LOW OUTPUT MODE | 5V | $5V \times \dfrac{R11}{R10 + R11}$ | 0.8A |

FIG.9

| MODE | MODE CONTROL SIGNAL Sr3 | TRANSISTOR 93 | TRANSISTOR 95 | VOLTAGE DIVIDING RATIO Kc | REFERENCE VOLTAGE Vr |
|---|---|---|---|---|---|
| NORMAL OUTPUT MODE | HIGH | ON | OFF | $\dfrac{R18}{R17 + R18}$ | $Vk \times \dfrac{R18}{R17 + R18}$ |
| LOW OUTPUT MODE | LOW | OFF | ON | $\dfrac{R22}{R17 + R22}$ | $Vk \times \dfrac{R22}{R17 + R22}$ |

* R22 IS A COMBINED RESISTANCE BETWEEN R18 AND R19

FIG.14

| MODE | TRANSISTOR 137 | TRANSISTOR 139 | COMPARATOR 41 |
|---|---|---|---|
| LOW OUTPUT MODE | OFF | ON | OUTPUT IS ENABLED |
| NORMAL OUTPUT MODE | ON | OFF | OUTPUT IS HALTED |

POWER SUPPLY SYSTEM AND IMAGE FORMING APPARATUS INCLUDING THE SAME

CROSS REFERENCE TO RELATED APPLICATION

The present application claims priority from Japanese Patent Application No. 2010-267368, which was filed on Nov. 30, 2010, the disclosure of which is incorporated herein by reference in its entirety.

TECHNICAL FIELD

The present disclosure relates to a power supply system and an image forming apparatus.

BACKGROUND

Japanese Unexamined Patent Application Publication No. 2009-153234 suggests a technology for selecting a threshold voltage in an overcurrent control circuit. The threshold voltage is selected according to operating modes, normal output mode and low load mode. An output voltage of a transformer on the secondary side is high in normal output mode and low in low-load mode, for example, on standby. A voltage induced in a primary auxiliary winding connected to a power-supply terminal VCC of a power-supply control IC corresponds to a voltage calculated by multiplying the output voltage of the power supply unit by a turn ratio of the transformer. Therefore, the output voltage of the power supply and the auxiliary winding have a proportional relationship. The switching power supply in the above document changes the threshold voltage applied to an overcurrent control comparator according to variations in the supply voltage VCC. Specifically, the threshold voltage in low load mode is set lower than the threshold voltage in normal output mode. With this configuration, a peak current of a MOSFET in low load mode is regulated to a lower level than that in normal output mode.

If the output voltage of the switching power supply in low load mode is 5 V and that in normal output mode is 24 V, the output voltage in normal output mode is 4.8 times higher than that in low load mode. In general, the supply voltage VCC of the power supply control IC is 14 V or higher. Therefore, the voltage induced in the primary auxiliary winding needs to be set to 15 V, for example. In normal output mode, the voltage induced in the primary auxiliary winding is 72 V. Namely, the voltage higher than a tolerance that is about 20 V is applied to the power supply control IC.

A step-down circuit may be connected between the primary auxiliary winding and the power supply control IC to reduce the voltage below the tolerance of the power supply control IC so that the voltage higher than the tolerance is not applied. However, if the voltage is reduced, a selection range of the threshold voltage (hereinafter also referred to as a reference voltage) for overcurrent detection is narrowed. This is because the selection range is defined according to a ratio of variations in the supply voltage VCC, that is, the selection range varies proportional to variations in the supply voltage VCC. If the power supply control IC does not have a voltage limitation, the supply voltage VCC is 15 V in low load mode and 72 V in normal output mode. Namely, the supply voltage VCC in normal output mode is 4.8 times higher than that in low load mode. If the threshold voltage for overcurrent detection in low load mode is V1, the threshold voltage in normal output mode is V1×4.8. Namely, the threshold voltage can be varied from the level in low load mode to the level in normal output mode, which is 4.8 times higher than the level in low load mode. The selection range is a "4.8-time" selection range. However, the power supply control IC actually has a voltage limitation. The supply voltage VCC of the power-supply IC is limited to 20 V in normal output mode. Therefore, the supply voltage VCC in normal output mode is only about 1.3 times higher than that in low load mode (20 V/15 V≈1.3). If the threshold voltage in low load mode is V1, the threshold voltage in normal output mode is V1×1.3. Namely, the selection range is a "1.3-time" selection range.

Therefore, there is a need to provide a technology for achieving a wide selection range of reference voltages for overcurrent detection in a power supply system in which the different reference voltages are set for different modes, respectively.

SUMMARY

A power supply system according to an illustrative aspect of the present invention includes a switching power supply and a control unit. The switching power supply is configured to output a first output voltage in normal output mode and a second output voltage lower than the first output voltage in low output mode. The control unit is configured to switch the mode of the switching power supply. The switching power supply includes a transformer, a semiconductor switch, a rectifier/smoothing circuit, an overcurrent detection circuit, and a switch control circuit. The transformer is configured to induce a voltage in a secondary side by oscillation of a primary side. The semiconductor switch is connected to a primary coil of the transformer. The rectifier/smoothing circuit is configured to rectify and smooth the voltage induced in the secondary side of the transformer. The overcurrent detection circuit is configured to detect an overcurrent in the switching power supply. The overcurrent detection circuit is provided on a secondary side of the transformer. The overcurrent detection circuit includes a current detecting resistor, a reference voltage generation circuit, and a comparison circuit. The current detecting resistor is provided on the secondary side of the transformer to obtain a voltage proportional to an output current of the switching power supply. The reference voltage generation circuit is configured to generate a first reference voltage in a condition that the output voltage of the switching power supply is the first output voltage and a second reference voltage lower than the first reference voltage in a condition that the output voltage of the switching power supply is the second output voltage. The comparison circuit is configured to detect the overcurrent by comparing the voltage across the current detecting resistor with the first reference voltage and the second reference voltage. The switch control circuit is configured to control the semiconductor switch in a condition that the overcurrent is detected and thereby reducing the overcurrent.

A power supply system according to another illustrative aspect of the present invention includes a switching power supply and a control unit. The switching power supply is configured to output a first output voltage in normal output mode and a second output voltage lower than the first output voltage in low output mode. The control unit is configured to switch the mode of the switching power supply. The switching power supply includes a transformer, a semiconductor switch, a rectifier/smoothing circuit, an overcurrent detection circuit, and a switch control circuit. The transformer is configured to induce a voltage in a secondary side by oscillation of a primary side. The semiconductor switch is connected to a primary coil of the transformer. The rectifier/smoothing circuit is configured to rectify and smooth the voltage induced in the secondary side of the transformer. The overcurrent detection circuit is configured to detect an overcurrent in the switching power supply. The overcurrent detection circuit is provided on the secondary side of the transformer. The overcurrent detection circuit includes a first overcurrent detection circuit and a second overcurrent detection circuit. The first overcurrent detection circuit is configured to detect the overcurrent of the switching power supply in normal output mode by comparing the voltage across the first current detecting resistor with the first reference voltage. The second overcurrent detection circuit is configured to detect the overcurrent of the switching power supply in low output mode by comparing the voltage across the second current detecting resistor with the second reference voltage.

BRIEF DESCRIPTION OF THE DRAWINGS

FIG. 4 is a table illustrating output voltages of a switching power supply unit in different modes;

FIG. 6 is a table illustrating reference voltages of a comparator in different modes;

FIG. 9 is a table illustrating reference voltages of a comparator in different modes;

FIG. 14 is a table illustrating on/off states of transistors in a shutoff circuit.

DETAILED DESCRIPTION OF THE ILLUSTRATIVE ASPECTS

<First Illustrative Aspect>
A first illustrative aspect will be hereinafter explained with reference to FIGS. 1 to 6.

1. Printer

Figure 1:
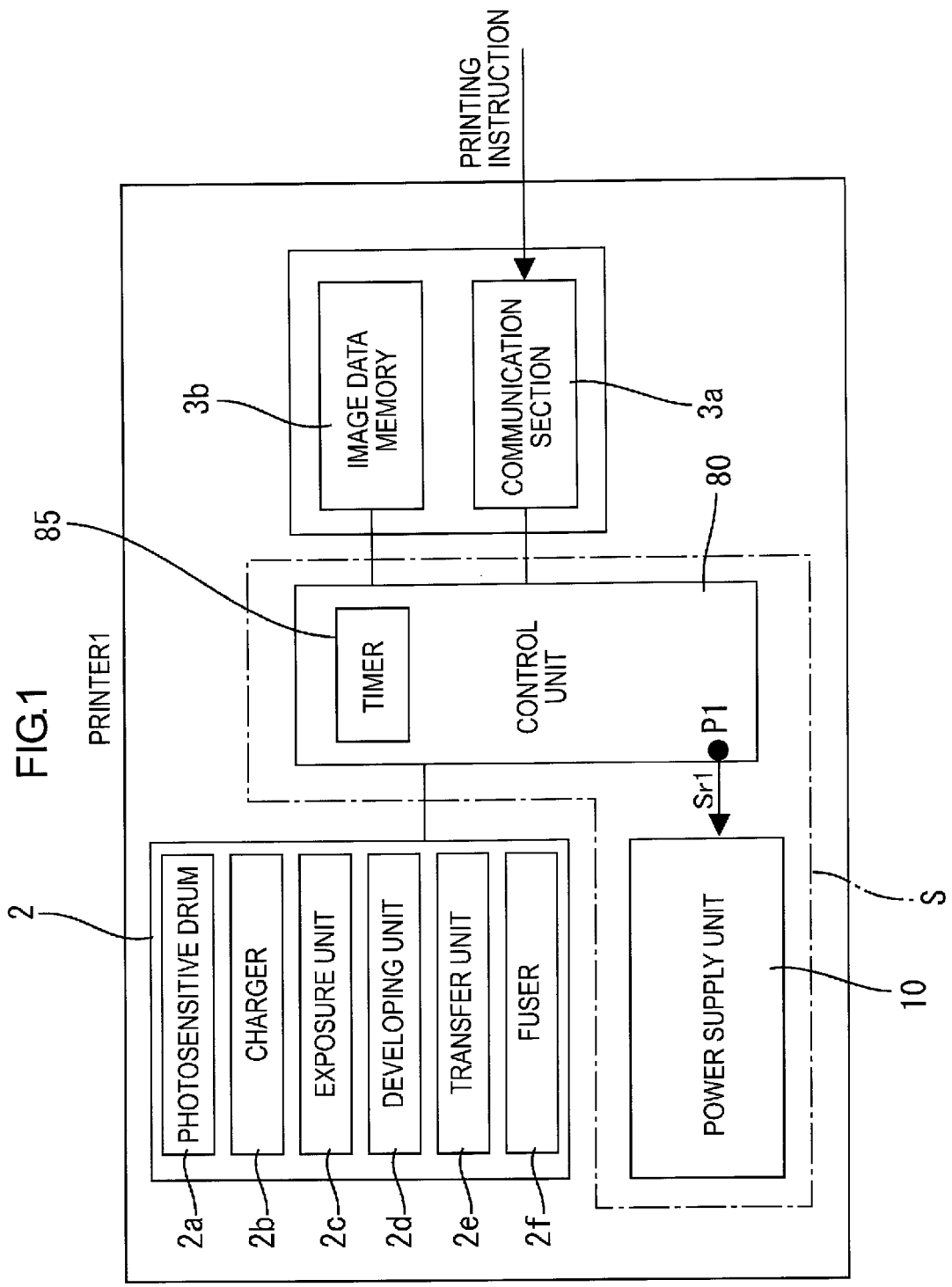
FIG. 1 is a block diagram illustrating an electrical configuration of a printer according to a first illustrative aspect.

As illustrated in FIG. 1, a printer 1 includes a printing section 2, a communication section 3a, an image data memory 3b, and a power supply system S. The power supply system S includes a power supply unit 10 and a control unit 80. The power supply unit 10 is a power supply for the printer 1 and configured to supply power to the printing section 2, the communication section 3a, the image data memory 3b, and the control unit 80. The control unit 80 includes an internal memory (not illustrated) and a timer 85. The internal memory is configured to store various kinds of data. The printer 1 is an example of an image forming apparatus.

The printing section 2 includes a photosensitive drum 2a, a charger 2b, an exposure unit 2c, a developing unit 2d, a transfer unit 2e, and a fuser 2f. The charger 2b executes a charging process for building up an electrical charge on a surface of the photosensitive drum 2a. The exposure unit 2c executes an exposing process for forming an electrostatic latent image on the surface of the photosensitive drum 2a. The developing unit 2d executes a developing process for attaching developers to the electrostatic latent image on the surface of the photosensitive drum 2a and forming a developer image. The transfer unit 2e executes a transfer process for transferring the developer image to a recording medium. The fuser 2f executes a fusing process for fixing the developer image transferred onto the recording medium.

The printing section 2 performs printing operation by executing the charging process, the exposing process, the developing process, the transfer process, and the fusing process. The communication section 3a communicates with an information terminal such as a PC. The communication section 3a receives a printing instruction and printing data. The image data memory 3b temporarily stores the printing data sent from the information terminal.

When the communication section 3a receives the printing instruction and the printing data from the information terminal, the control unit 80 controls the printing section 2 to perform the printing operation. As a result, the printing data is printed on the recording medium. The operating voltage of the printing section 2 is 24 V. The operating voltage of the communication section 3a, the image data memory 3b, and the control unit 80 is 3.3 V. The printing section 2 is an example of a high-voltage component. The control unit 80 is an example a first low voltage component. The communication section 3a is an example of a second low voltage component.

2. Circuit Configurations

Next, a configuration of the power supply unit 10 in the power supply system S will be explained with reference to FIG. 2. The power supply unit 10 includes a switching power supply 20 and a DC-DC converter 70. The DC-DC converter 70 is an example of a step-down circuit. The switching power supply 20 includes a rectifier/smoothing circuit 21, a transformer 23, a field effect transistor (FET) 25, a rectifier/smoothing circuit 27, a voltage detection circuit 29, an overcurrent detection circuit 35, and a control IC 50. The FET 25 is an example of a semiconductor switch. The control IC 50 is an example of a switch control circuit.

The rectifier/smoothing circuit 21 is a so-called capacitor input type circuit including a bridge diode D1 and a smoothing capacitor C1. The bridge diode D1 rectifies an AC voltage of, for instance, 220 V generated by an AC power supply 15. The smoothing capacitor C1 smoothes out the voltage after the rectification. The transformer 23 is provided on the output side of the rectifier/smoothing circuit 21. An input voltage Vin, which is a voltage obtained by rectifying the AC voltage and smoothing out the rectified voltage, for instance, about 32 VDC, is applied to the primary coil N1 of the transformer 23 via an input line Lin.

The FET 25 is an N-channel MOSFET. A drain D of the FET 25 is connected to the primary coil N1 and a source S thereof is grounded. A gate G of the FET 25 is connected to an output port OUT of the control IC 50. When on-off signals (PWM signals) are sent from the control IC 50 to the gate G via the output port OUT, the FET 25 turns on and off. As a result, the primary side of the transformer 23 oscillates and a voltage is induced in the secondary coil N2 of the transformer 23.

A voltage generator circuit 26 is provided on the primary side of the transformer 23. The voltage generator circuit 26 is configured to smooth out a voltage induced in the auxiliary coil N3 provided on the primary side of the transformer 23 by a diode D2 and a capacitor C2. The voltage generator circuit 26 generates a voltage of about 20 V. The voltage generator circuit 26 is a power source of the control IC 50.

Resistors R14 and R15 are connected in series between an output line of the voltage generator circuit 26 and the ground. The output line of the voltage generator circuit 26 is connected to a power supply port VCC of the control IC 50, which will be explained later. A ratio of resistance of the resistor R14 to resistance of the resistor R15 is 19:1. A 1-V voltage appears at a connecting point between the resistor R14 and the resistor R15.

Figure 2:
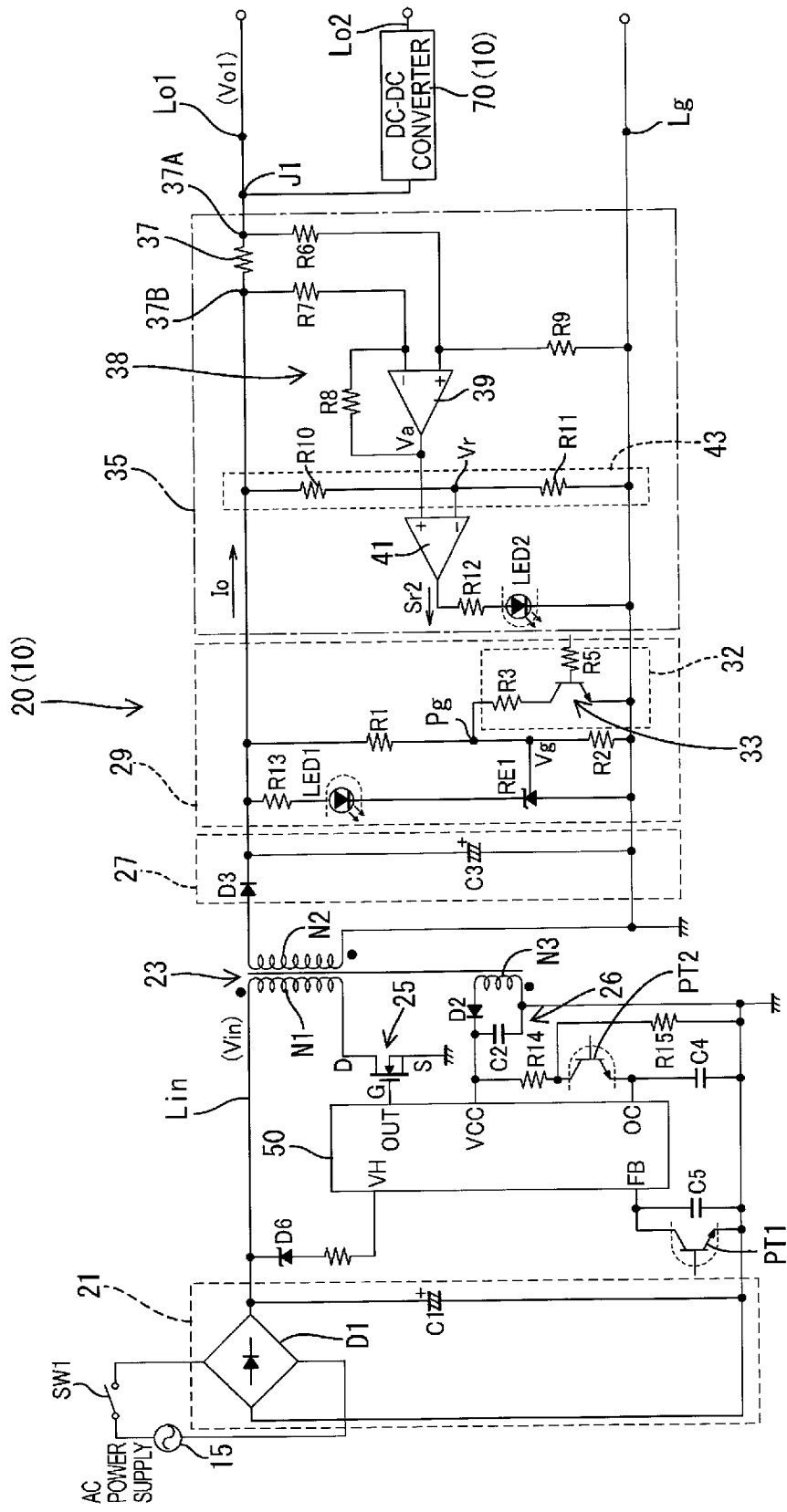
FIG. 2 is a circuit diagram of a power supply unit in a power supply system.

As illustrated in FIG. 2, the control IC 50 has five ports, the power supply port VCC, a high voltage input port VH, a feedback port FB, the output port OUT, and the overcurrent detection port OC. The power supply port VCC is connected to the voltage generator circuit 26. The high voltage input port VH is connected to the input line Lin via a zener diode D6. The feedback port FB receives a feedback signal from the voltage detection circuit 29. A bypass capacitor C4 is connected between the overcurrent detection port OC and the ground. Another bypass capacitor C5 is connected between the feedback port FB and the ground.

Figure 3:
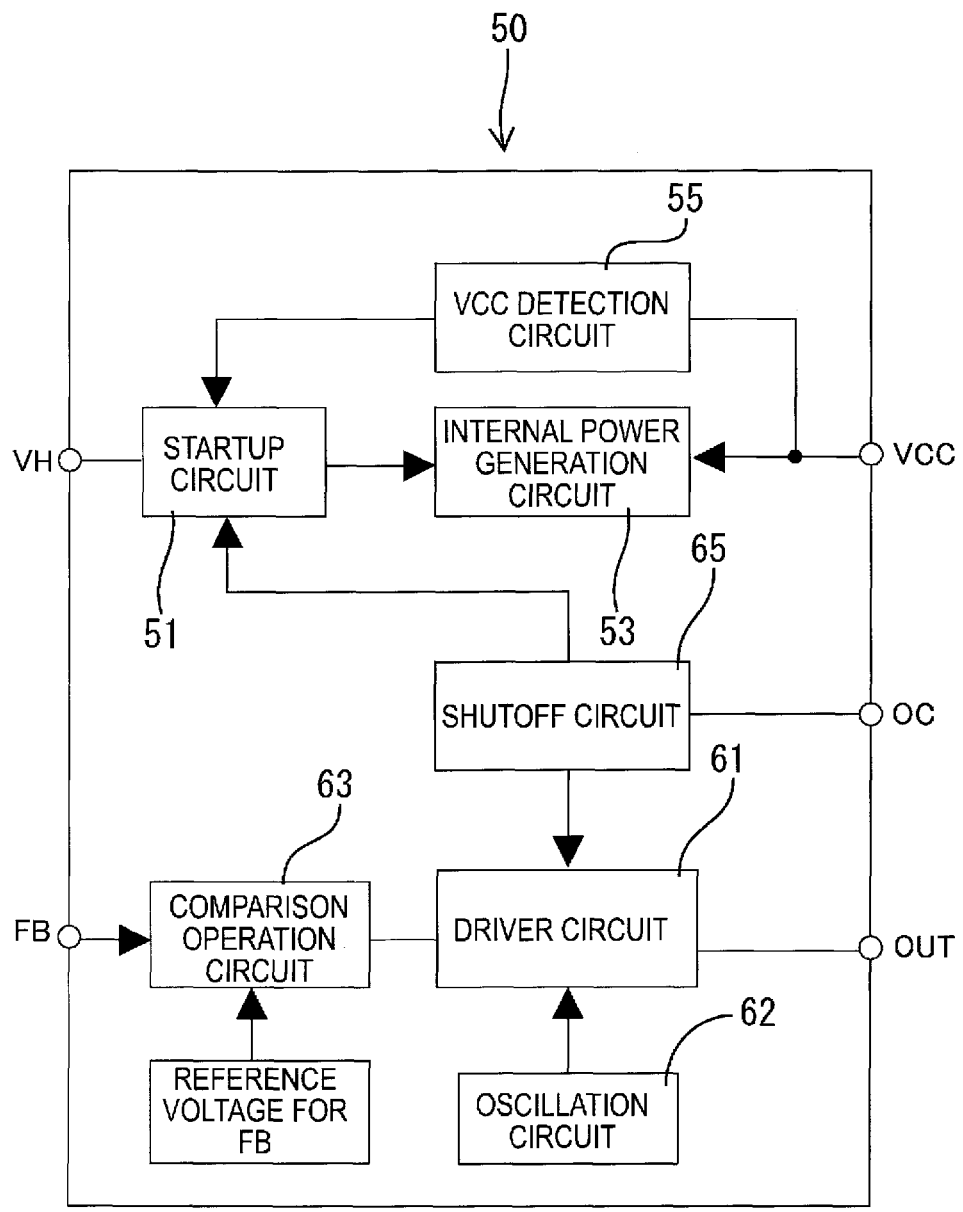
FIG. 3 is a block diagram illustrating an electrical configuration of a control IC.

As illustrated in FIG. 3, the control IC 50 includes a startup circuit 51, an internal power generation circuit 53, a VCC detection circuit 55, a driver circuit 61, a oscillation circuit 62, a comparison operation circuit 63, and a shutoff circuit 65. The VCC detection circuit 55 detects a voltage at the power supply port VCC. The oscillation circuit 62 produces a triangular wave with a constant frequency. The startup circuit 51 is configured to step down the input voltage input from the high voltage input port VH and to apply the stepped-down voltage to the internal power generation circuit 53.

From time immediately after a startup to time when the voltage at the power supply port VCC reaches a predefined level, the internal power generation circuit 53 receives power from the startup circuit 51, generates a 5-V source voltage, and supplies power to each circuit. After the voltage at the power supply port VCC reaches the predefined level, the internal power generation circuit 53 receive power from the voltage generation circuit 26, generates the 5-V supply voltage, and supplies power to the circuits 61 to 65.

The comparison operation circuit 63 is configured to compare a signal level of the feedback signal with a reference voltage for a feedback signal, and to output a signal to the driver circuit 61 corresponding to a result of the comparison. For example, the comparison operation circuit 63 outputs a signal with a level corresponding to a difference in level between the reference voltage and the level of feedback signal.

The driver circuit 61 generates a PWM signal according to the signal output by the comparison operation circuit 63 and the triangular wave produced by the oscillation circuit 62. The driver circuit 61 outputs the PWM signal to the gate G of the FET 25 via the output port OUT. The comparison operation circuit 63, the driver circuit 61, the FET 25, the transformer 23, and the voltage detection circuit 29 form a feedback system. The output voltage Vo1 of the switching power supply 20 is regulated to a target voltage by adjusting the PWM value for turning on and off the FET 25 based on the feedback signal output by the voltage detection circuit 29.

The shutoff circuit 65 has a function for controlling the overcurrent. When the voltage at the overcurrent detection port OC becomes high, the shutoff circuit 65 shuts off the output of the driver circuit 61. The shutoff circuit 65 sends an instruction to the startup circuit 51 to turn on simultaneously with the shutoff of the output of the driver circuit 61. With this configuration, the control IC 50 continues to receive power from the input line Lin even when the switching power supply 20 stops according to the shutoff of the output of the driver circuit 61.

The rectifier/smoothing circuit 27 is provided on the secondary side of the transformer 23. The rectifier/smoothing circuit 27 includes a diode D3 and a capacitor C3. The rectifier/smoothing circuit 27 rectifies and smoothes out the voltage induced in the secondary coil N2 of the transformer 23.

On the output side of the rectifier/smoothing circuit 27, the voltage detection circuit 29 and the overcurrent detection circuit 35 are provided. The voltage detection circuit 29 has a function for detecting the output voltage Vo1 of the switching power supply 20 and a function for adjusting the target level of the output voltage Vo1. The voltage detection circuit 29 includes a pair of detecting resistors R1 and R2, a voltage dividing ratio alteration circuit 32, a shunt regulator RE1, and a light-emitting diode LED1 that is connected in series with the shunt regulator RE1.

The detecting resistors R1 and R2 are connected in series between the output line Lo1 and the ground line Lg. The voltage dividing ratio alteration circuit 32 includes a detecting resistor R3 and a transistor 33. One end of the detecting resistor R3 is connected to the connecting point between the detecting resistors R1 and R2, and the other end of the detecting resistor R3 is connected to a collector of the transistor 33.

The transistor 33 is an NPN transistor. The emitter of the transistor 33 is grounded. The base of the transistor 33 is connected to the output port P1 of the control unit 80 via a resistor R5 (see FIG. 1).

A voltage dividing ratio Ka is defined by the detecting resistors R1 and R2. The dividing voltage ratio alteration circuit 32 has a function for altering the voltage dividing ratio Ka by turning on and off the transistor 33. As shown in FIG. 4, the voltage dividing ratio Ka is R4/(R1+R4) when the transistor 33 is turned on, and R2/(R1+R2) when the transistor 33 is turned off, where R4 is a combined resistance of R2 and R3.

Figure 5:
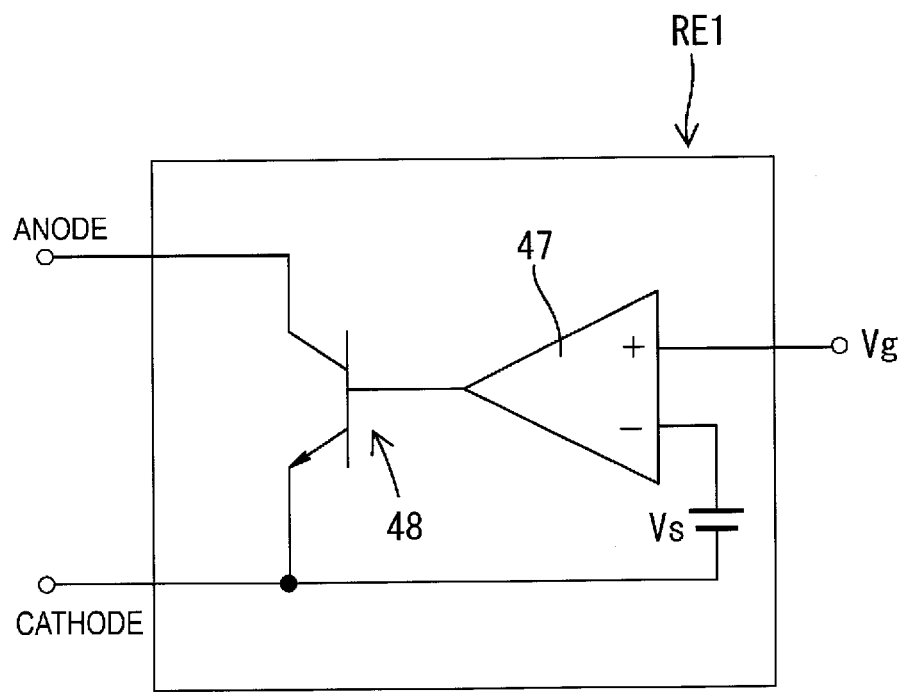
FIG. 5 is a circuit diagram of a shunt regulator.
Figure 7:
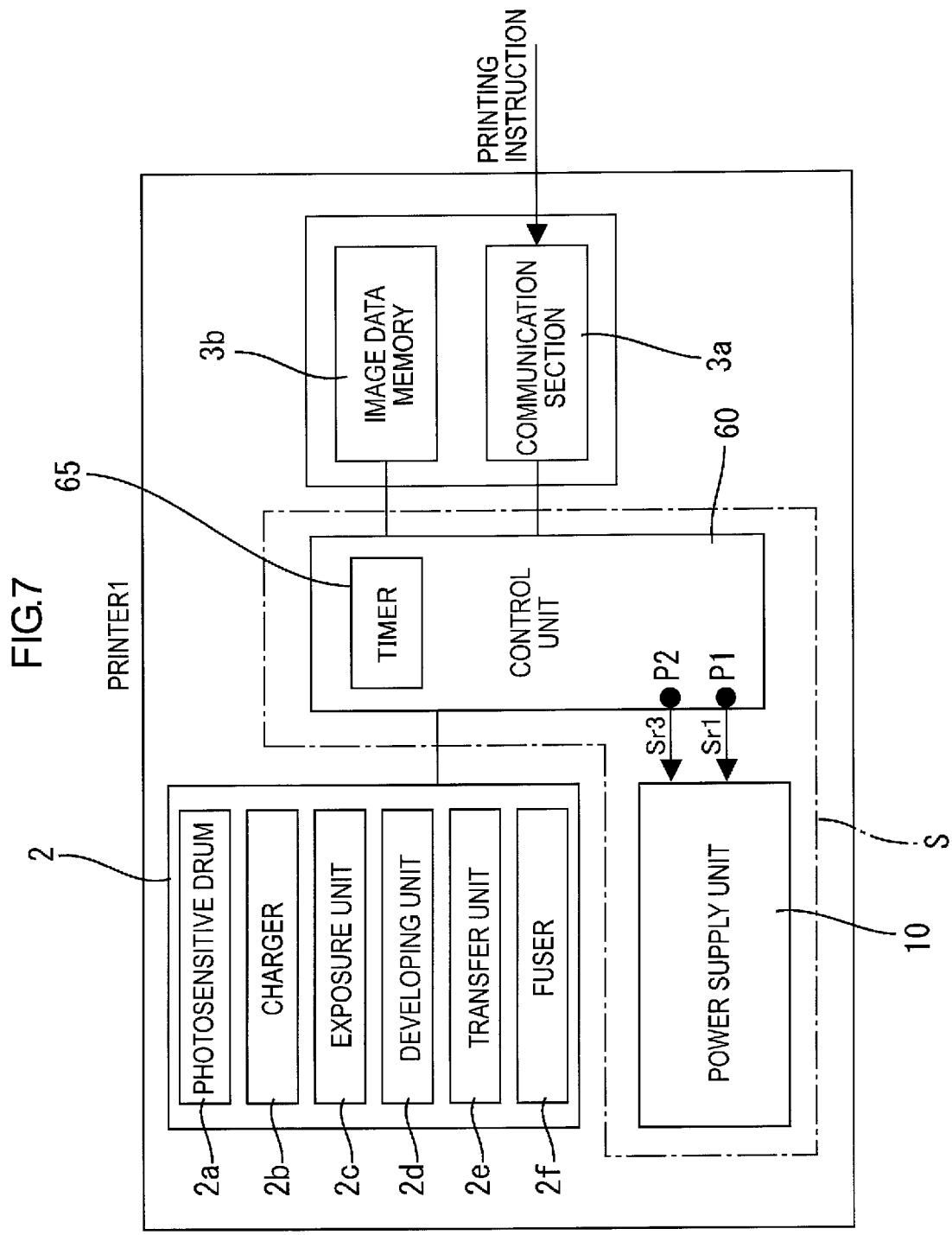
FIG. 7 is a block diagram illustrating an electrical configuration of a printer according to a second illustrative aspect.

As illustrated in FIG. 5, the shunt regulator RE1 includes an error amplifier 47 and a transistor 48 that is provided on the output side of the error amplifier 47. A reference voltage Vs of 2.5 V is applied to a negative input terminal of the error amplifier 47. A positive input terminal of the error amplifier 47 is connected to the connecting point Pg between R1 and R2. The output voltage Vo1 of the switching power supply 20 is divided according to the voltage dividing ratio Ka, and the divided voltage Vg is applied to the positive input terminal of the error amplifier 47.

The shunt regulator RE1 passes a current corresponding to the voltage difference between the reference voltage Vs and the divided voltage Vg. As a result, a current corresponding to the voltage difference flows through the light-emitting diode LED 1. The light-emitting diode LED1 outputs an optical signal with intensity corresponding to the voltage difference between the reference voltage Vs and the divided voltage Vg. The light-emitting diode LED1 and a phototransistor PT1 connected to the feedback port FB of the control IC 50 form a photo coupler.

The optical signal output by the light-emitting diode LED1 is converted to an electrical signal by the phototransistor PT1. A feedback signal indicating the voltage difference between the reference voltage Vs and the divided voltage Vg is fed back to the feedback port FB of the control IC 50.

The overcurrent detection circuit 35 is provided in a downstream stage with respect to the voltage detection circuit 29. The overcurrent detection circuit 35 includes a current detecting resistor 37, a subtraction circuit 38, a comparator 41, and a reference voltage generation circuit 43. The comparator 41 is an example of a comparison circuit.

The current detecting resistor 37 is provided in the output line Lo1 of the switching power supply 20 to generate a voltage proportional to the output current Io of the switching power supply 20. The subtraction circuit 38 includes an amplifier 39, and four resistors R 6 to R9. The amplifier 39 has two input terminals and one output terminal. The positive input terminal of the amplifier 39, which is a non-inverting input terminal, is connected to a terminal 37A of the current detecting resistor 37 via the resistor R6 and to the ground line Lg via the resistor R9.

The negative input terminal, which is an inverting input terminal, of the amplifier 39 is connected to a terminal 37B of the current detecting resistor 37 via the resistor R7, and to the output terminal of the amplifier 39 via the resistor R8. The output terminal of the amplifier 39 is connected to the positive input terminal of the comparator 41. The subtraction circuit 38 is configured to detect a voltage that appears across the current detecting resistor 37, and to input the voltage to the comparator 41.

The comparator 41 has two input terminals and one output terminal. The output voltage Va of the amplifier 39 is applied to the positive input terminal (the non-inverting input terminal) and the reference voltage Vr generated by the reference voltage generation circuit 43 is applied to the negative input terminal (the inverting input terminal).

The reference voltage generation circuit 43 includes a pair of resistors R10 and R11 connected in series between the output line Lo1 of the switching power supply 20 and the ground line Lg. The negative input terminal of the comparator 41 is connected to the connecting point between the resistors R10 and R11 via a signal line. The output voltage Vo1 of the switching power supply 20 is divided according to the voltage dividing ratio Kb defined by the resistors R10 and R11. The divided voltage is applied to the negative input terminal of the comparator 41 as the reference voltage Vr.

$$Kb = R11/(R10+R11) \tag{1}$$

The comparator 41 compares the output voltage Va of the amplifier with the reference voltage Vr, and outputs a binary signal based on a result of the comparison. If the output voltage Va is lower than the reference voltage Vr, that is, the overcurrent is not detected, it outputs a low-level signal. If the output voltage Va is higher than the reference voltage Vr, that is, the overcurrent is detected, it outputs a high-level signal, which is an overcurrent detected signal Sr2.

A light emitting diode LED2 is connected to the output terminal of the comparator 41. The anode of the light emitting diode LED 2 is connected to the output terminal of the comparator 41 via a resistor R12, and the cathode thereof is connected to the ground line Lg. The light emitting diode LED2 and a phototransistor PT2 form a photo coupler.

The emitter of the phototransistor PT2 is connected to the overcurrent detection port OC of the control IC 50, and the collector thereof is connected to the connecting point between the resistors R14 and R15.

As illustrated in FIG. 2, the output line Lo1 of the switching power supply 20 separates into two lines at a junction J1. A DC-DC converter 70 is provided in one of the lines. The DC-DC converter 70 steps down the output voltage Vo1 of the switching power supply 20 to 3.3 V and outputs it via an output line Lo2.

Next, the control unit 80 will be explained. The control unit 80 is included in the power supply system S together with the power supply unit 10. The control unit 80 is configured to control modes of the switching power supply 20 and the printing section 2 of the printer 1.

The output port P1 of the control unit 80 is provided as a port for controlling the modes of the switching power supply 20. The output port P1 is connected to the base of the transistor 33 of the voltage dividing ratio alteration circuit 32 via the resistor R5.

The control unit 80 switches the mode of the switching power supply 20 between the normal output mode and the low output mode by sending the mode control signal Sr1 to the base of the transistor 33 via the output port P1.

3. Mode Control by the Control Unit 80

3-1. Mode Switching Between the Normal Output Mode and the Low Output Mode

As expressed by equation (2) provided below, the target level of the output voltage Vo1 of the switching power supply 20 is set proportional to a reciprocal of the voltage dividing ratio Ka defined by the detecting resistors in the voltage detection circuit 29. When the voltage dividing ratio Ka is reduced, the target level of the output voltage Vo1 increases. When the voltage dividing ratio Ka is increased, the target level of the output voltage Vo1 decreases.

$$Vo1 = Vs/Ka \tag{2}$$

$$Ka1 = R4/(R1+R4) \tag{3}$$

$$Ka2 = R2/(R1+R2) \tag{4}$$

where Vo1 is the output voltage of the switching power supply 20, Vs is the reference voltage of the shunt regulator RE1, Ka1 and Ka2 are voltage dividing radios of the sensing resistance in the voltage detection circuit 29, and R4 is a combined resistance between R2 and R3.

The output voltage Vo1 of the switching power supply 20 can be adjusted by altering the voltage dividing ratio Ka according to the high mode control signal Sr1 or the low mode control signal Sr1 output by the control unit 80. With this configuration, the mode of the switching power supply 20 can be switched between the normal output mode and the low output mode.

While the high mode control signal Sr1 is being output by the control unit 80, the transistor 33 turns on. Therefore, the voltage dividing ratio Ka is Ka1 calculated by equation (3). While the low mode control signal Sr1 is being output by the control unit 80, the transistor 33 turns off. Therefore, the voltage dividing ratio Ka is Ka2 calculated by equation (4).

The relationship between the voltage dividing ratio Ka1 and the voltage dividing ratio Ka2 is expressed by Ka1<Ka2. The target level Vo1 of the switching power supply 20 is set to 24 V, which is a high voltage, while the high mode control signal Sr1 is output by the control unit 80. Namely, the switching power supply 20 is set in normal output mode. The target level Vo1 is set to 5 V, which is a low voltage, while the low mode control signal Sr1 is output by the control unit 80. Namely, the switching power supply 20 is set in low output mode. "24 V" is an example of a first output voltage and "5 V" is an example of a second output voltage. Voltages other than the above voltages can be selected for the first output voltage and the second output voltage.

3.2 Alteration of the Reference Voltage Vr According to the Mode Switching

The reference voltage generation circuit 43 in the overcurrent detection circuit 35 includes a pair of the resistors R10 and R11 connected in series. The output voltage Vo1 of the switching power supply 20 is divided according to the voltage dividing ratio Kb defined by the resistors R10 and R11. The divided voltage is applied to the negative input terminal of the comparator 41 as the reference voltage Vr.

According to the mode of the switching power supply 20, the reference voltage Vr of the comparator 41 is automatically adjusted to either one of levels expressed by equations (5) and (6) provided in the next paragraph. The reference voltage Vr2 in low output mode, in which the output voltage is 5 V, is 5/24 times the reference voltage Vr1 in normal output mode, in which the output voltage is 24 V (see FIG. 6).

$$Vr1=24\times R11/(R10+R11) \qquad (5)$$

$$Vr2=5\times R11/(R10+R11) \qquad (6)$$

When the output current Io of the switching power supply 20 in normal output mode is set to 4 A, the maximum output current in low output mode is 5/24 times 4 A, which is 0.8 A.

In low output mode, in which the load is lower than in normal output mode, the output current Io of the switching power supply 20 can be adjusted according to the level of the load. Therefore, a large flow of the output current Io in normal output mode is restricted in low output mode.

The reference voltage Vr1 in normal output mode is an example of a first reference voltage and the reference voltage Vr2 in low output mode is an example of a second reference voltage.

4. Operation of the Power Supply System 4-1. Switching to the Normal Output Mode after the Turn-on of the AC Power Supply 15

When a power supply switch SW1 (see FIG. 2) is closed, the input voltage Vin produced by rectifying and smoothing the AC voltage is applied to the input line Lin. As a result, the input voltage Vin is applied to the high-voltage input port VH of the control IC 50, and the control IC 50 is turned on.

When the control IC 50 is turned on, it starts outputting on-off signals (or the PWM signals) to the gate G of the FET 25. The FET 25 repeatedly turns on and off. As a result, the primary side of the transformer of the switching power supply 20 starts oscillating and a voltage is induced in the secondary side of the transformer 23 (a start of oscillation).

The control IC 50 executes a so-called soft start control after it starts outputting the on-off signals. Therefore, the output voltage Vo1 of the switching power supply 20 slowly increases. When the output voltage Vo1 exceeds a specified level, the control IC switches the control from the soft start control to the feedback control and outputs the PWM signals according to the feedback signals input through the feed back port FB.

When the power supply switch SW1 is closed, the control unit 80 outputs the high mode control signal Sr1 and the transistor 33 turns on. As a result, the voltage dividing ratio Ka is set to Ka1 and the target level of the output voltage Vo1 is 24 V.

According to the above operation, the output of the switching power supply 20 is set to 24 V. The DC-DC converter 70 steps down the output voltage of the switching power supply 20 from 24 V to 3.3 V.

In normal output mode, the power supply 10 supplies power to the components of the printer 1. The power is supplied from the switching power supply 20 to the printing section 2 via the output line Lo1, that is, the 24-V power-supply voltage is applied thereto. The power is supplied from the switching power supply 20 to the communication section 3a, the image data memory 3b, and the control unit 80 via the DC-DC converter 70, that is, the power supply voltages of 3.3 V are applied thereto. As a result, the printer 1 is set in a state capable of printing, that is, capable of receiving a printing instruction from the information terminal and executing printing process according to the printing instruction.

In normal output mode, a voltage proportional to the output current Io of the switching power supply 20 appears across the current detecting resistor 37. If the output current Io is lower than 4 A, which is the maximum value in normal output mode, the output of the comparator 41 becomes low. As a result, no current flows through the light emitting diode LED2 and the light emitting diode LED2 turns off. Therefore, the phototransistor PT2 turns off and the voltage at the overcurrent detection port OC of the control IC 50 remains at the ground level, that is, the low level. Specifically, the ground level is 0 V.

If the output current Io of the switching power supply 20 exceeds 4 A, the output voltage Va of the subtraction circuit 38 becomes higher than the reference voltage Vr1.

Therefore, the comparator 41 outputs the high overcurrent detected signal Sr2. As a result, a current flows through the light emitting diode LED2 and the light emitting diode LED2 turns on. The phototransistor PT2 turns on and the voltage at the overcurrent detection port OC of the control IC 50 becomes equal to the voltage at the connecting point between the resistors R14 and R15, which is substantially 1 V, that is, becomes high.

The shutoff circuit 65 of the control IC 50 shuts off the output of the driver circuit when the overcurrent detection port OC becomes high, that is, 1 V. As a result, the transformer stops oscillating, and the output of the switching power supply 20 is halted. The overcurrent is cut off. The output halt of the switching power supply 20 is canceled when the power supply switch SW1 is closed again.

4-2. Switching from the Normal Output Mode to the Low Output Mode

In normal output mode, the control unit 80 measures waiting time using the timer 85. The waiting time includes time for waiting the next printing instruction or operation on an operation section (not illustrated) of the printer 1. The control unit 80 starts measuring the waiting time when a warm-up process after the closure of the power supply switch SW1 is completed, a printing process is completed, or an operation on the operation section by the user is completed. When the waiting time reaches a preset time, the control unit 80 switches the mode of the switching power supply 20 from the normal output mode to the low output mode.

The control unit 80 outputs the low mode control signal Sr1 via the output port P1. As a result, the transistor 33 turns off, and the voltage dividing ratio Ka is changed from Ka1 to Ka1. Therefore, the target level of the output voltage Vo1 is set to 5 V.

According to the above operation, the output of the switching power supply 20 becomes 5 V. The output of the DC-DC converter 70 is 3.3 V. Namely, the switching power supply 20 is in low output mode. In low output mode, the power is supplied from the switching power supply 20 to the control unit 80, the communication section 3a, and the image data memory 3b via the DC-DC converter 70, that is, the 3.3 V power supply voltages are applied thereto in the same manner as in normal output mode.

In low output mode, the output voltage Vo1 of the switching power supply 20 is 5 V, which is lower than the 24 V operating voltage for the printing section 2. As a result, the power supply to the printing section 2 is halted. In low output mode, the printer 1 is able to perform the communication process and the writing process for writing printing data received in the communication process to the image data memory 3b. However, operation of the printing section completely stops.

In low output mode, a voltage proportional to the output current Io of the switching power supply 20 appears across the current detecting resistor 37. If the output current Io is lower than 0.8 A, the output of the comparator 41 becomes low. As a result, no current flows through the light emitting diode LED2 and the light emitting diode LED2 turns off. The phototransistor PT2 turns off and thus the voltage at the overcurrent detection port OC of the control IC 50 remains at the ground level, that is, remains low.

When the output current Io exceeds 0.8 A, the output voltage Va of the subtraction circuit 38 becomes higher than the reference voltage Vr2.

Therefore, the comparator 41 outputs the high overcurrent detected signal Sr2. As a result, a current flows through the light emitting diode LED2 and the light emitting diode LED2 turns on. The phototransistor PT2 turns on and thus the voltage at the overcurrent detection port OC of the control IC 50 becomes equal to the voltage at the connecting point between the resistors R14 and R15, that is, becomes high, which is substantially 1 V.

The shutoff circuit 65 of the control IC 50 stops the output of the driver circuit 61 when the voltage at the overcurrent detection port OC becomes high, that is, 1 V. The transformer 23 stops oscillating and the output of the switching power supply 20 is halted. As a result, the overcurrent is shut off. The output halt of the switching power supply 20 is canceled when the power supply switch SW1 is closed again.

4-3. Switching from the Low Output Mode to the Normal Output Mode

In low output mode, the control unit 80 monitors the communication or the operation on the operating section if it is performed. The control unit 80 outputs the high mode control signal Sr1 via the output port P1 if one of the following conditions is satisfied: the communication section 3a receives print data according to a print instruction from the information terminal; the print instruction is issued; and the operating section is operated. As a result, the transistor 33 turns on. The voltage dividing ratio Ka is switched from Ka2 to Ka1. As a result, the target level of the output voltage Vo1 is set to 24 V. According to the above operation, the switching power supply 20 outputs the 24 V, that is, returns to normal output mode.

5. Advantageous Effects

In the printer 1 including the power supply system S, the output current of the switching power supply 20 can be adjusted according to the load size in low output mode, in which the load is smaller than in normal output mode. In low output mode, a large flow of the output current Io as in normal output mode can be restricted.

If the overcurrent detection circuit 35 is provided on the primary side, the range of the reference voltage Vr is limited, that is, a large range cannot be set due to the tolerance of the control IC 50. In the power supply system S, the overcurrent detection circuit 35 is provided on the secondary side of the transformer 23. Therefore, the range of the reference voltage Vr can be set without being limited by the tolerance of the control IC 50.

In the configuration for adjusting the reference voltage for the overcurrent detection according to the mode, the range of the reference voltage Vr can be set wider than the reference voltage range that can be set in the configuration in which the overcurrent detection circuit 35 is provided on the primary side. In this illustrative aspect, the range of the reference voltage Vr can be set as wide as a range defined by a ratio of the output voltage Vo1 in normal output mode to the output voltage Vo1 in low output mode, that is, 24:5. Furthermore, the reference voltage generation circuit 43 in the power supply system S is provided with a simple configuration having a pair of the resistors R10 and R11 connected in series.

<Second Illustrative Aspect>

Next, a second illustrative aspect will be explained with reference to FIGS. 7 to 11. In the first illustrative aspect, the reference voltage generation circuit 43 in the power supply system S includes the resistors R10 and R11. A power supply system in this illustrative aspect includes a reference voltage generation circuit 90 instead of the reference voltage generation circuit 43. In association with the modification of the reference voltage generation circuit, an output port P2 is added to the control unit 80 (see FIG. 7).

Figure 8:
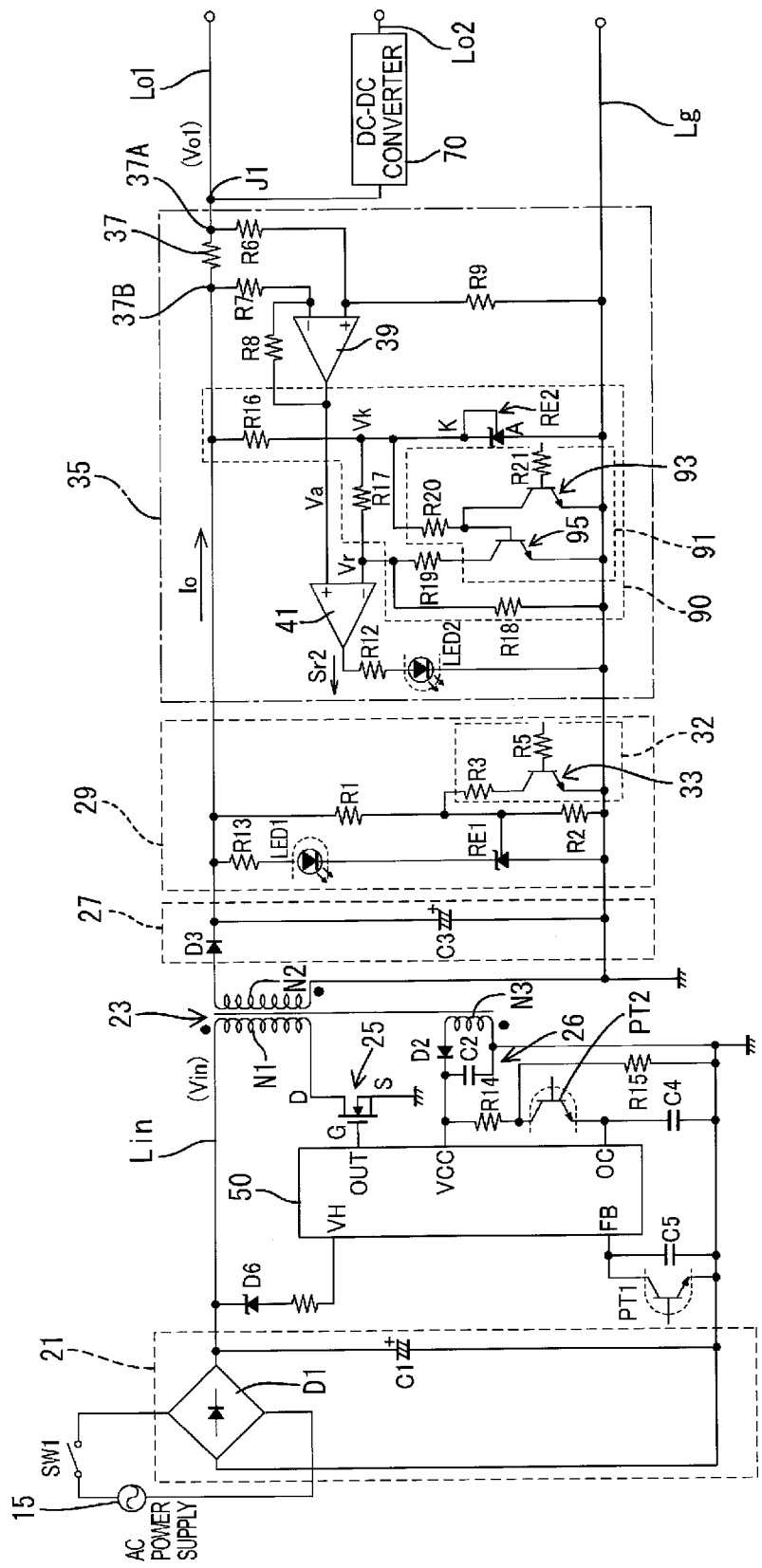
FIG. 8 is a circuit diagram of a power supply unit in a power supply system.
Figure 10:
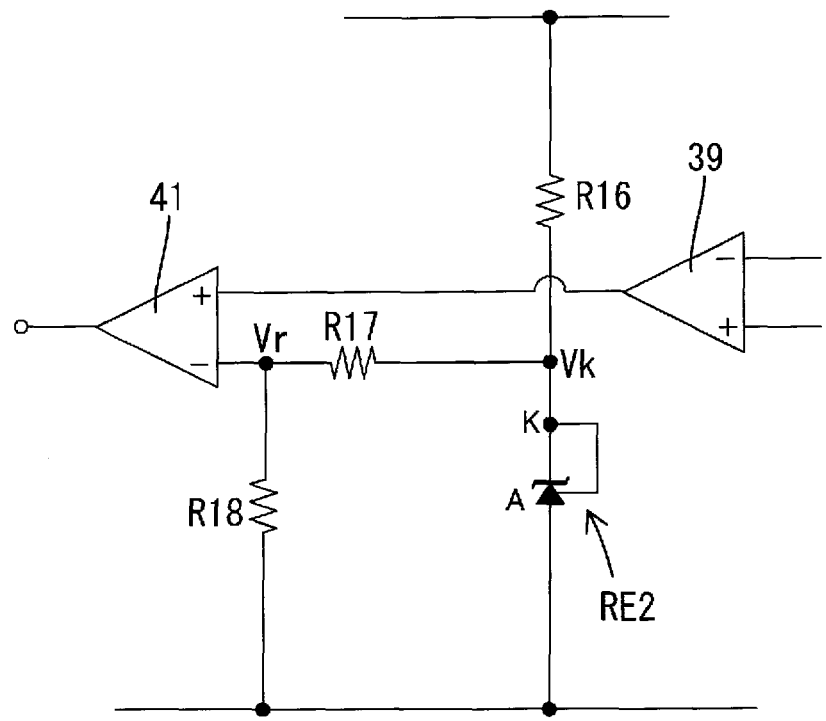
FIG. 10 is a circuit diagram illustrating connections of resistors R17 to R19 in normal output mode.
Figure 11:
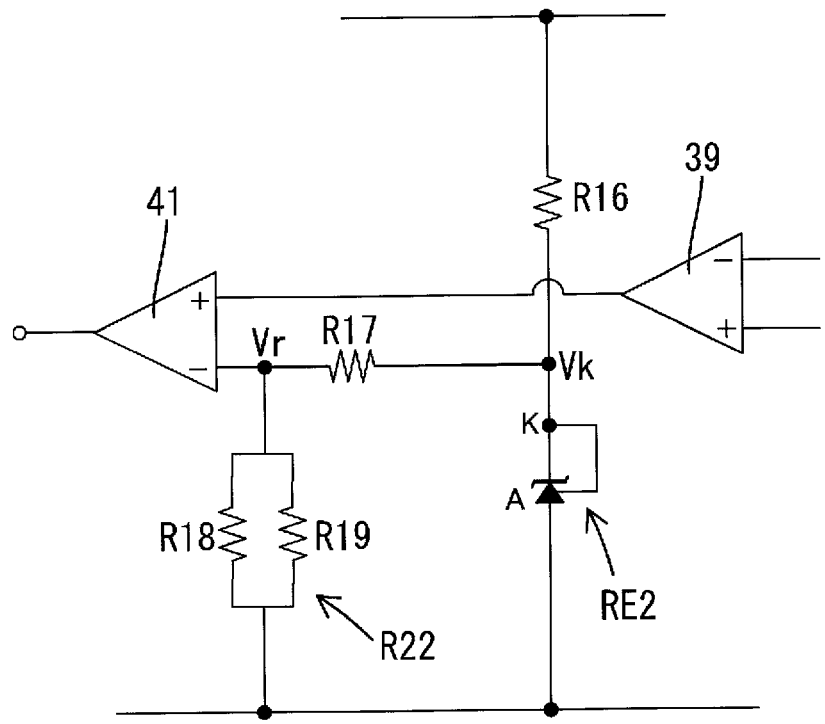
FIG. 11 is a circuit diagram illustrating connections of resistors R17 to R19 in low output mode.

As illustrated in FIG. 8, the reference voltage generation circuit 90 of this illustrative aspect includes a shunt regulator RE2, the first resistor R17, the second resistor R18, the third resistor R19, and a switching circuit 91. A cathode K of the shunt regulator RE2 is connected to an output line Lo1 via a resister R16. An anode A of the shunt regulator RE2 is connected to a ground line Lg. A reference of the shunt regulator RE2 is connected to the cathode K. The shunt regulator RE2 is a constant voltage circuit configured to generate a constant voltage Vk at the cathode K.

The first end of the first resistor R17 is connected to a negative terminal (an inverting input terminal) of a comparator 41 and the second end thereof is connected to the cathode K of the shunt regulator RE2 at the other end. The first end of the second resistor R18 is connected to the negative terminal of the comparator 41 and the second end thereof is connected to the ground line Lg.

The third resistor R19 is connected in parallel to the second resistor R18. The first end of the third resistor R19 is connected to the negative terminal of the comparator 41 and the second end thereof is connected to the ground line Lg via a transistor 95. Therefore, a voltage Vr1 or Vr2 obtained by dividing the constant voltage Vk according to a voltage dividing ratio of a voltage divider including the resistors R17 to R19 is applied to the negative terminal of the comparator 41. A circuit including the first resistor R17, the second resistor R18, and the third resistor R19 is an example of a resistor circuit including a plurality of resistors.

The switching circuit 91 includes the transistor 95, a transistor 93, a resistor R20, and a resistor R21. The transistor 95 is an NPN transistor. A collector of the transistor 95 is connected to the second end of the resistor 19 and an emitter thereof is connected to the ground line Lg. A base of the transistor 95 is connected to the cathode K of the shunt regulator RE2 via the resistor R20.

The transistor 93 is an NPN transistor. A collector of the transistor 93 is connected to the base of the transistor 95 and an emitter thereof is connected to the ground line Lg. A base of the transistor 93 is connected to an output port P2 of the control unit 80 via the transistor R21.

The control unit 80 is configured to output a switching signal Sr3 from the output port P2 to set the reference voltage Vr of the comparator 41 according to output mode of the switching power supply 20.

In normal output mode, the control unit 80 outputs a high switching signal Sr3 from the output port P2. As a result, the transistor 93 turns on and the transistor 95 turns off. As expressed by the following equations (7) and (8), the reference voltage Vr of the comparator 41 is a voltage Vr1 obtained by dividing the voltage Vk according to a voltage dividing ratio Kc1 defined by the resistor R17 and the resistor 18 (see FIGS. 9 and 10).

In low output mode, the control unit 80 outputs a low switching signal Sr3. According to the low switching signal Sr3, the transistor 93 turns off and the transistor 95 turns on.

As expressed by the following equations (9) and (10), the reference voltage Vr of the comparator 41 is a voltage Vr2 obtained by dividing the voltage Vk according to a voltage dividing ratio Kc2 defined by the resistor R17 and a resistance R22, where the resistance R22 has a combined resistance between the resistors R18 and R19.

$$Kc1 = R18/(R17+R18) \quad (7)$$

$$Vr1 = Vk \times Kc1 \quad (8)$$

$$Kc2 = R22/(R17+R22) \quad (9)$$

$$Vr2 = Vk \times Kc2 \quad (10)$$

The transistor 95 turns on and off according to the switching signal Sr3. The voltage dividing ratio of the voltage divider varies according to the on/off operation of the transistor 95. A resistor circuit including the resistors R17 to R19 outputs the reference voltage Vr1 or Vr2, whichever is selected to the comparator 41. The resistance R22 is always smaller than the resistor 18 and thus the reference voltage Vr2 of the comparator 41 in low output mode is lower than the reference voltage Vr1 of the comparator 41 in normal output mode.

In low output mode, in which the load is small, the output current Io of the switching power supply 20 in this illustrative aspect can be limited to a low level. The voltage dividing ratio Kc of the voltage divider can be adjusted by changing the setting of the resistances of the resistors R17 to R19 in the power supply system S of this illustrative aspect. The maximum value of the output current Io is adjustable. A wide selection range can be set for the reference voltage Vr. Furthermore, high flexibility in setting of the reference voltage can be achieved.

Other configurations of the power supply system S of this illustrative aspect are the same as the first illustrative aspect. The same components as those in the first illustrative aspect are indicated by the same symbols. The reference voltage Vr1 in normal output mode is an example of the first reference voltage and the reference voltage Vr2 in low output mode is an example of the second reference voltage.

<Third Illustrative Aspect>

A third illustrative aspect will be explained with reference to FIGS. 12 to 14. In the first illustrative aspect, a single overcurrent detection circuit 35 is used for detecting an overcurrent in both normal output mode and low output mode. In this illustrative aspect, different overcurrent detection circuits are provided for respective output modes. Specifically, a first overcurrent detection circuit 100 and a second overcurrent detection circuit 130 are provided for normal output mode and low output mode, respectively.

The first overcurrent detection circuit 100 is provided on the primary side of the transformer 23 and the second overcurrent detection circuit 130 is provided on the secondary side of the transformer 23.

The first overcurrent detection circuit 100 includes a first current detecting resistor 101 and a control IC 110. The first end of the first current detecting resistor 101 is connected to a source of an FET 25 and the second end thereof is grounded. The first current detecting resistor 110 is used to obtain a voltage proportional to a primary current flowing through a primary coil N1 of the transformer 23. The resistance of the first current detecting resistor 101 is set so that the voltage across the first current detecting resistor 101 is in the following range. If the peak primary current of the transformer 23 is smaller than 3.5 A, that is, no overcurrent flows, the voltage across the first current detecting resistor 101 is equal to or lower than 0.5 V. If the peak primary current is larger than the 3.5 A, that is, an overcurrent occurs, the voltage across the first current detecting resistor 101 is equal to or higher than 0.5 V. When the primary current of 3.5 A is converted to the output current Io of the switching power supply 20, the current is 4 A.

An overcurrent detection port OC of the control IC 110 is connected to connecting point between the primary current detecting resistor 101 and the FET 25 via a resistor R25. The voltage across the first current detecting resistor 101 is applied to the overcurrent detection port OC.

The control IC 110 just like the control IC 50 of the first illustrative aspect has five ports including a power supply port VCC, a high voltage input port VH, a feedback port FB, an output port OUT, and the overcurrent detection port OC. The overcurrent detection port OC is an example of an input port.

The control IC 110 includes a startup circuit 51, an internal voltage generation circuit 53, a VCC detection circuit 55, a driver circuit 61, a oscillation circuit 62, a comparison operation circuit 63, a reference voltage generation circuit 113, and a comparison shutoff circuit 115.

The reference voltage generation circuit 113 generates a reference voltage Vr3 for overcurrent detection. The reference voltage Vr3 is used for detecting an overcurrent in normal output mode. The reference voltage Vr3 is set so that the overcurrent is detected when the primary current of the transformer 23 becomes 3.5 A. For example, the reference voltage Vr3 is set to 0.5 V.

The comparison shutoff circuit 115 detects an overcurrent by comparing a voltage at the overcurrent detection port OC with the reference voltage Vr3. If the voltage at the overcurrent detection port OC is lower than the reference voltage Vr3, the comparison shutoff circuit 115 determines that no overcurrent has occurred. If the voltage at the overcurrent detection port OC is higher than the reference voltage Vr3, the comparison shutout circuit 115 determines that an overcurrent has occurred. If the comparison shutoff circuit 115 determines that an overcurrent has occurred, it halts an output of the driver circuit 61.

In normal output mode, the transformer 23 stops oscillating when the primary current thereof becomes higher than 3.5 A. As a result, the output of the switching power supply 20 is halted and thus the overcurrent is shut off.

The second overcurrent detection circuit 130 includes a second current detecting resistor 131, a subtraction circuit 38, a comparator 41, a reference voltage generation circuit 133, and a shutdown circuit 135. The comparator 41 is an example of a comparison circuit.

The second current detecting resistor 131 is provided in the output line Lo1 of the switching power supply 20. The second current detecting resistor 131 is used to obtain a voltage proportional to the output current Io of the switching power supply 20. The subtraction circuit 38 includes an amplifier 39 and resistors R6 to R9. The subtraction circuit 38 detects a voltage across the second current detecting resistor 131 and outputs the voltage to the comparator 41.

The comparator 41 has two input terminals and one output terminal. An output voltage Va of the amplifier 39 is applied to a positive input terminal of the comparator 41. A reference voltage Vr4 generated by the reference voltage generation circuit 133 is applied to a negative input terminal (an inverting input terminal) of the comparator 41.

The reference voltage generation circuit 133 is a constant voltage circuit including a shunt regulator RE3. The reference voltage generation circuit 133 applies the reference voltage Vr4, which is a constant voltage, to the negative input terminal of the comparator 41. The reference voltage Vr4 is used for detecting an overcurrent in low output mode. The reference voltage Vr4 is set so that the overcurrent is detected when the output current Io of the switching power supply 20 becomes 0.8 A.

The comparator 41 compares the output voltage Va of the amplifier 39 with the reference voltage Vr4 and outputs binary signals corresponding to a result of the comparison. Specifically, if the output voltage Va is lower than the reference voltage Vr4, that is, no overcurrent has occurred, the comparator 41 outputs a low signal. If the output voltage Va is higher than the reference voltage Vr4, that is, an overcurrent has occurred, the comparator 41 outputs a high signal, which is an overcurrent detected signal Sr2.

A light emitting diode LED2 is connected to the output terminal of the comparator 41. An anode of the light emitting diode LED2 is connected to the output terminal of the comparator 41 via the resistor R12 and a cathode thereof is connected to the ground line Lg via a transistor 139 of the shutdown circuit 135.

The shutdown circuit 135 includes a transistor 137, the transistor 139, a zener diode D7, and resistors R26 and R27. The transistor 139 is an NPN transistor. A collector of the transistor 139 is connected to the cathode of the light emitting diode LED2 and an emitter thereof is connected to the ground line Lg. A base of the transistor 139 is connected to a collector of the transistor 137.

The transistor 137 is an NPN transistor. A collector of the transistor 137 is connected to the output line Lo1 of the switching power supply 20 via the resistor R27 and an emitter thereof is connected to the ground line Lg. A base of the transistor 137 is connected to the output line Lo1 of the switching power supply 20 via the zener diode D7 and the resistor R26.

A breakdown voltage of the zener diode D7 is set so that the transistor 137 turns off in low output mode and the turns on in normal output mode. The output voltage is 5 V in low output mode and 24 V in normal output mode.

As illustrated in FIG. 14, when the transistor 137 turns off in low output mode, the transistor 139 turns on. As a result, the output of the comparator 41 is enabled. When the transistor 137 turns on in normal output mode, the transistor 139 turns off. As a result, the output of the comparator 41 is halted. With this configuration, the second overcurrent detection circuit 130 operates only in low output mode and does not operate in normal output mode.

Figure 12:
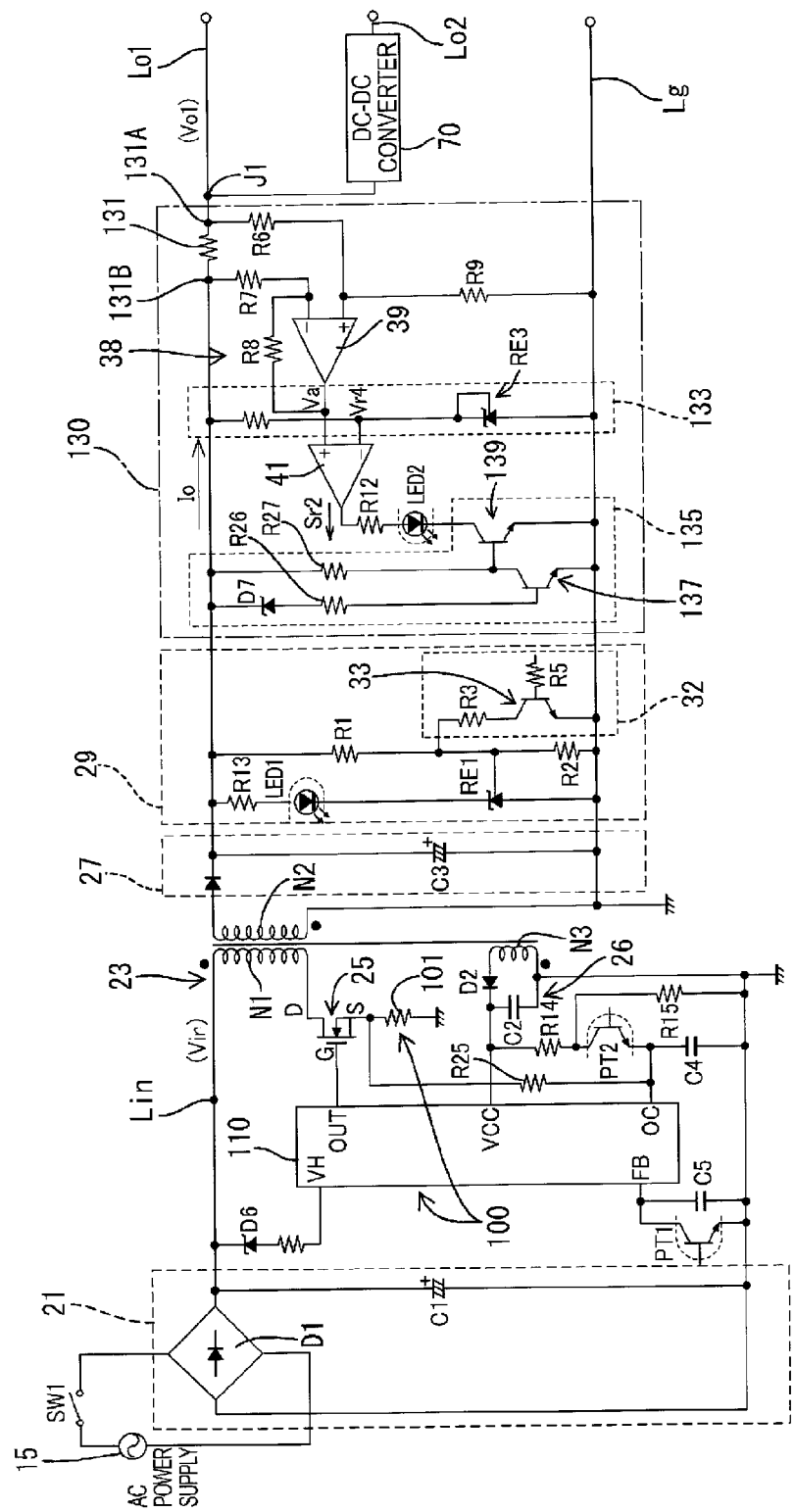
FIG. 12 is a circuit diagram of a power supply unit in a power supply system according to a third illustrative aspect.
Figure 13:
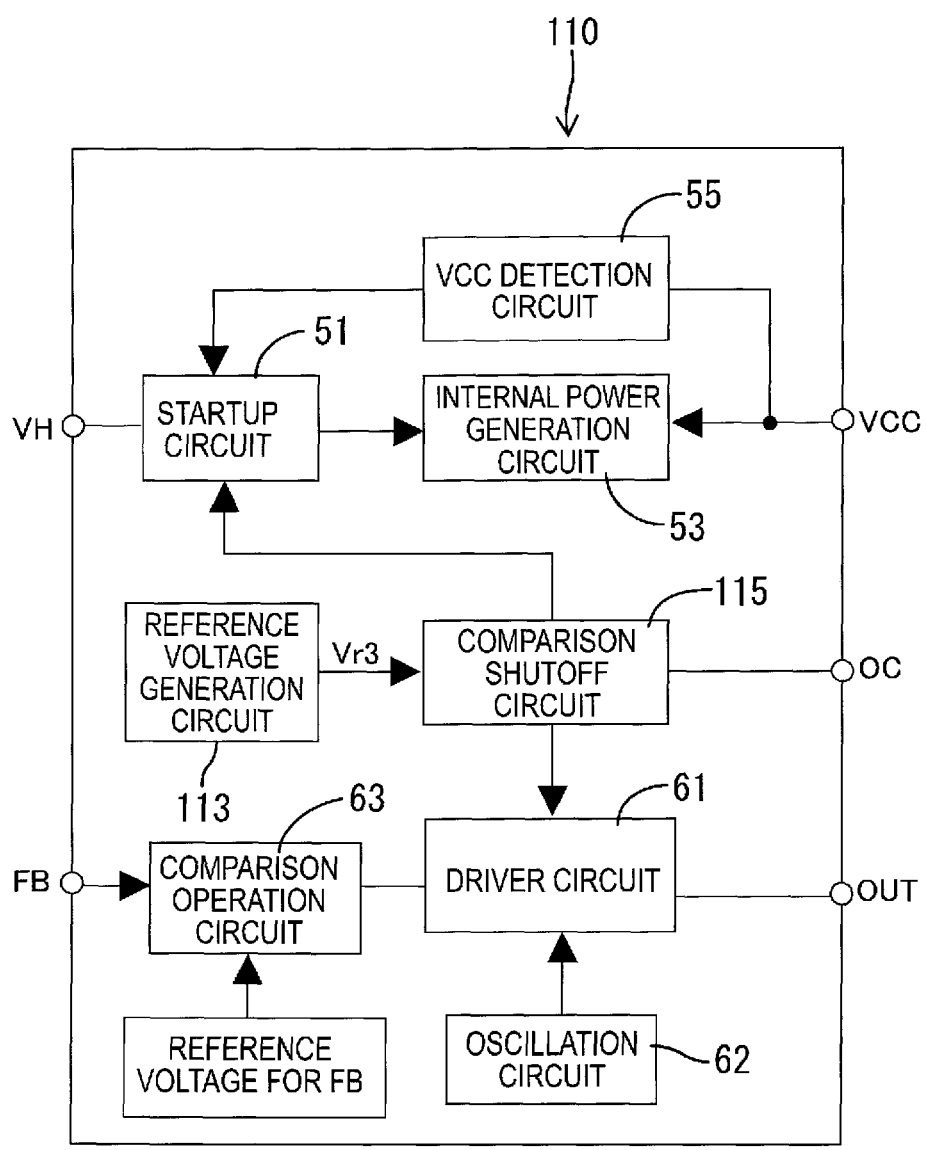
FIG. 13 is a block diagram illustrating an electrical configuration of a control IC.

As illustrated in FIG. 12, the light emitting diode LED2 in the output line of the comparator 41 and a photo transistor PT2 form a photo coupler. An emitter of the photo transistor PT2 is connected to the overcurrent detection port OC of the control IC 110 and a collector thereof is connected to a connecting point between the resistors R14 and R15.

In low output mode, if the output current Io of the switching power supply 20 is smaller than 0.8 A, which is the maximum value in low output mode, the comparator 41 outputs a low signal. As a result, the light emitting diode LED2 turns off and the photo transistor PT2 turns off. Therefore, the voltage at the overcurrent detection port OC of the control IC 110 is at the ground level (or low).

In low output mode, if the output current Io is larger than 0.8 A, that is, an overcurrent has occurred, the comparator 41 outputs the overcurrent detected signal Sr2, which is a high signal. As a result, a current flow through the light emitting diode LED2 and the light emitting diode LED2 turns on. Moreover, the photo transistor PT2 turns on. The voltage at the overcurrent detection port OC of the control IC 110 becomes equal to the voltage at the connecting point between the resistors R14 and R15, which is high substantially equal to 1 V that is, becomes high. Namely, a binary signal, a high signal or a low signal corresponding to the result of the comparison by the comparator (the comparison between Va and Vr4) is input to the overcurrent detection port OC.

When the voltage at the overcurrent detection port OC becomes high, which is 1 V in this illustrative aspect, the comparison shutoff circuit 115 halts the output of the driver circuit 61. As a result, the transformer 23 stops oscillating and the output of the switching power supply 20 is halted. Therefore, the overcurrent is shut off.

When the voltage at the overcurrent detection port OC becomes high (or 1 V), the comparison shutoff circuit 115 halts the output of the driver circuit 61. This is because the reference voltage Vr3 for the normal output mode is set to 0.5 V, which is lower than the high voltage, that is, 1 V.

As described earlier, the power supply system S of this illustrative aspect includes the overcurrent detection circuit 100 for the normal output mode and the overcurrent detection circuit 130 for the low output mode, which are provided on the primary side and the secondary side of the transformer 23, respectively. The reference voltages Vr3 and Vr4 for the overcurrent detection can be set independently from each other. Therefore, a wide selection range for the reference voltage Vr can be set.

In this illustrative aspect, the output of the comparator 41 of the second overcurrent detection circuit 130 for the low output mode is halted by the shutdown circuit 135 in normal output mode. With this configuration, the switching power supply 20 properly operates. If the second overcurrent detection circuit 130 performs the overcurrent detection in normal output mode, it may determine that an overcurrent has occurred when the output current Io of the switching power supply 20 is larger than 0.8 A. In such a case, the transformer 23 may accidentally stop oscillating even when the output current Io is smaller than 4 A in normal output mode.

In this illustrative aspect, the control IC 110 performs the setting of the reference voltage Vr3 and the comparison, which are functions of the first overcurrent detection circuit 100. Therefore, the first overcurrent detection circuit 100 can be constructed of only the control IC 110 and the first current detecting resistor 101. Furthermore, the first overcurrent detection circuit 100 and the second overcurrent detection circuit 130 share the overcurrent detection port OC in this illustrative aspect. The number of ports of the control IC 110 can be reduced in comparison to a configuration in which the circuits 100 and 130 require respective ports.

In this illustrative aspect, the voltage across the first current detecting resistor 101 becomes equal to or lower than 0.5 V when the primary current of the transformer 23 is smaller than 3.5 A, that is, no overcurrent has occurred. Therefore, the power consumption by the first current detecting resistor 101 can be reduced.

The configuration of the power supply system S in this illustrative aspect other than the above is the same as the first illustrative aspect. The same components are indicated by the same symbols. The reference voltage Vr3 in normal output mode is an example of the first reference voltage and the reference voltage Vr4 in low output mode is an example of the second reference voltage.

<Other Illustrative Aspects>

The scope of the present invention is not limited to the illustrative aspects described above with reference to the drawings. The following illustrative aspects may be included in the technical scope of the present invention.

(1) In the first to the third illustrative aspects, the power supply systems S are used for the printers. However, the power supply systems S are not limited to the use for the printers. The power supply systems S can be used for any types of electrical devices. For example, the power supply systems S can be used for home appliances including television sets and VCRs. The printers in the first to the third illustrative aspects are electrophotographic printers. However, the power supply systems S can be used for inkjet printers.

(2) In the first to the third illustrative aspects, the FETs are used as semiconductor switches. However, bipolar transistors can be used as semiconductor switches.

(3) In the second illustrative aspect, the control unit 80 has the output port P2 and outputs the switching signal Sr3 other than the mode control signal Sr1 through the output port P2. The reference voltage Vr of the comparator 41 is set according to the switching signal Sr3. However, the switching signal Sr3 may be substituted by the mode control signal Sr1. In that case, the output port P2 is not required. Specifically, the base of the transistor 93 is connected to the output port P1 of the control unit 80 via the resistor R21 and the reference voltage Vr of the comparator 41 is set according to the mode control signal Sr1. With this configuration, the number of the output ports can be reduced.

(4) In each of the first to the third illustrative aspects, the overcurrent is controlled by stopping the oscillation of the transformer 23. However, the overcurrent can be controlled by reducing the output current Io of the switching power supply 20.

What is claimed is:

1. A power supply system comprising:
   a switching power supply configured to output a first output voltage in normal output mode and a second output voltage lower than the first output voltage in low output mode; and
   a control unit configured to switch the mode of the switching power supply, the switching power supply comprising:
   a transformer configured to induce a voltage in a secondary side by oscillation of a primary side;
   a semiconductor switch connected to a primary coil of the transformer;
   a rectifier/smoothing circuit configured to rectify and smooth the voltage induced in the secondary side of the transformer;
   an overcurrent detection circuit configured to detect an overcurrent in the switching power supply and provided on the secondary side of the transformer, the overcurrent detection circuit comprising:
   a current detecting resistor configured to obtain a voltage proportional to an output current of the switching power supply;
   a reference voltage generation circuit configured to generate a first reference voltage in a condition that the output voltage of the switching power supply is the first output voltage and a second reference voltage lower than the first reference voltage in a condition that the output voltage of the switching power supply is the second output voltage; and
   a comparison circuit configured to detect the overcurrent by comparing the voltage across the current detecting resistor with the first reference voltage or the second reference voltage; and
   a switch control circuit configured to control the semiconductor switch in a condition that the overcurrent is detected and thereby reducing the overcurrent.

2. The power supply system according to claim 1, wherein the reference voltage generation circuit comprises a pair of resistors connected in series between an output line of the switching power supply and a ground line.

3. The power supply system according to claim 1, wherein the reference voltage generation circuit comprises a resistor circuit including a plurality of resistors and a switch circuit configured to switch a voltage dividing ratio of the resistor circuit by switching between on and off according to a switching signal output from the control unit, the resistor circuit being configured to generate one of the first reference voltage and the second reference voltage selected according to the voltage dividing ratio.

4. An image forming apparatus comprising:
   the power supply system according to claim 1;
   a high voltage component configured to receive power from the switching power supply at the first output voltage and to execute a printing process;
   a first low voltage component configured to receive power from the switching power supply via a step-down circuit and to control the high voltage component;
   a second low voltage component configured to receive power from the switching power supply via the step-down circuit and to execute a communication process to receive printing data; wherein:
   the high voltage component configured to perform the printing process for printing the printing data under control of the first low voltage component when the second low voltage component receives the printing data; and
   the switching power supply configured to supply power to the high voltage component with the first output voltage and to the first low voltage component and the second low voltage component via the step-down circuit in normal output mode, and to supply no power to the high voltage component and power to the first low voltage component and the second low voltage component via the step-down circuit in low output mode.

5. A power supply system comprising:
   a switching power supply configured to output a first output voltage in normal output mode and a second output voltage lower than the first output voltage in low output mode; and
   a control unit configured to switch the mode of the switching power supply, the switching power supply comprising:
   a transformer configured to induce a voltage in a secondary side by oscillation of a primary side;
   a semiconductor switch connected to a primary coil of the transformer;
   a rectifier/smoothing circuit configured to rectify and smooth the voltage induced in the secondary side of the transformer; and
   an overcurrent detection circuit configured to detect an overcurrent in the switching power supply by comparing a voltage across a current detecting resistor with a reference voltage, the overcurrent detection circuit comprising:
   a first overcurrent detection circuit configured to detect the overcurrent of the switching power supply in normal output mode by comparing a voltage across a first current detecting resistor provided on the primary side of the transformer with a first reference voltage; and
   a second overcurrent detection circuit configured to detect the overcurrent of the switching power supply in low output mode by comparing a voltage across a second current detecting resistor provided on a secondary side of the transformer with a second reference voltage; and a switch control circuit configured to control the semiconductor switch in a condition that the overcurrent is detected and thereby reducing the overcurrent.

6. The power supply system according to claim 5, wherein the second overcurrent detection circuit comprises:
the second current detecting resistor;
a reference voltage generation circuit configured to generate the second reference voltage;
a comparison circuit configured to perform a comparison between the voltage across the second current detecting resistor and the second reference voltage and to detect the overcurrent based on a result of the comparison; and
a shutoff circuit configured to shut off an output of the comparison circuit in a condition that the output voltage of the switching power supply is the first output voltage.

7. The power supply system according to claim 6, wherein the switch control circuit has an input port through which the voltage across the first current detecting resistor is input, and is configured to detect the overcurrent of the switching power supply in normal output mode by comparing a voltage at the input port with the first reference voltage.

8. The power supply system according to claim 5, wherein the switching control circuit has an input port and is configured to receive the voltage across the first current detecting resistor and a binary signal according to a result of the detection by the second overcurrent detection circuit through the input port.

9. An image forming apparatus comprising:
the power supply system according to claim 5;
a high voltage component configured to receive power from the switching power supply at the first output voltage and to execute a printing process;
a first low voltage component configured to receive power from the switching power supply via a step-down circuit and to control the high voltage component;
a second low voltage component configured to receive power from the switching power supply via the step-down circuit and to execute a communication process to receive printing data; wherein:
the high voltage component configured to perform the printing process for printing the printing data under control of the first low voltage component when the second low voltage component receives the printing data; and
the switching power supply configured to supply power to the high voltage component with the first output voltage and to the first low voltage component and the second low voltage component via the step-down circuit in normal output mode, and to supply no power to the high voltage component and power to the first low voltage component and the second low voltage component via the step-down circuit in low output mode.

* * * * *